I. FENNO & P. HOWE.
Cloth-Cutting Machines.
No. 5,061.
Reissued Sep. 17, 1872.
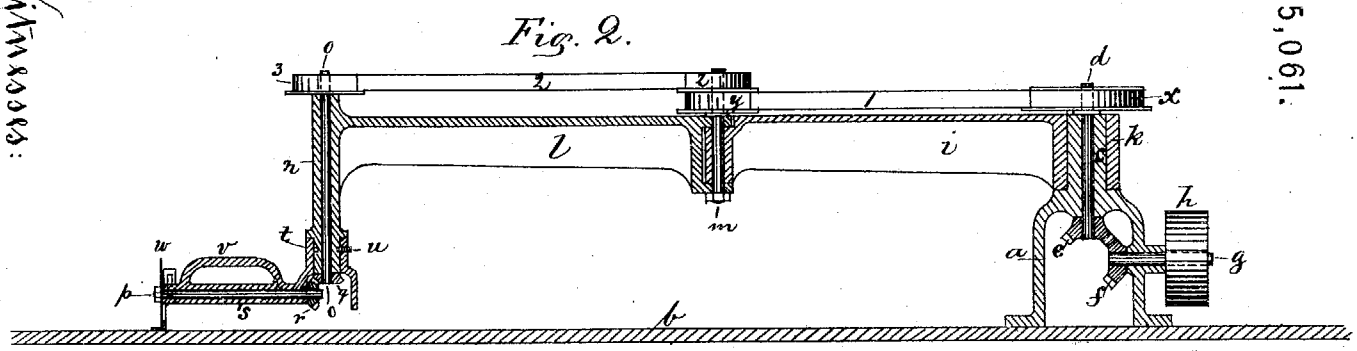
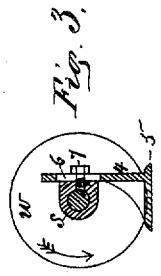
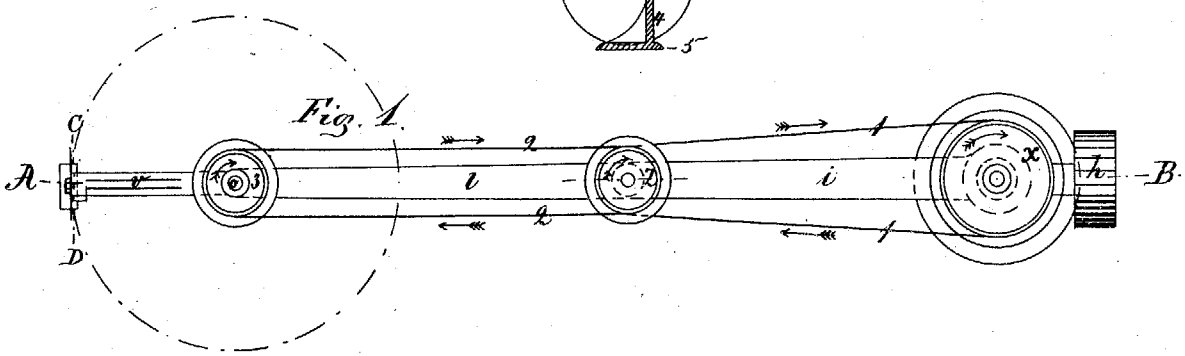
Witnesses:
F. J. Gibley
Wm. H. Hutchinson
Inventors:
Isaac Fenno & P. Howe
by Alex. Andrew their atty.
AM. PHOTO-LITHOGRAPHIC CO. N.Y. (OSBORNE'S PROCESS.)

UNITED STATES PATENT OFFICE.

ISAAC FENNO AND PATRICK HOWE, OF BOSTON, MASSACHUSETTS; SAID HOWE ASSIGNOR TO R. D. GOODWIN, C. M. BLAKE, A. K. TOHNAN, J. B. FISKE, AND H. G. HARTSHORN.

IMPROVEMENT IN CLOTH-CUTTING MACHINES.

Specification forming part of Letters Patent No. 129,327, dated July 16, 1872; reissue No. 5,061, dated September 17, 1872.

*To all whom it may concern:*

Be it known that we, ISAAC FENNO and PATRICK HOWE, both of Boston, in the county of Suffolk and State of Massachusetts, have jointly invented certain new and useful Improvements on Cloth-Cutting Machines, of which the following is a specification:

Our invention relates to improvements on cutting-machines for cloth or other textile or fibrous materials, consisting in the employment of a rotary cutting-disk, operated in the end of one or more swinging, jointed, or revolving arms, the whole being so arranged as to swing around a stationary standard attached to the operating-table. The cutting-disk can be operated by means of belts, gears, shafts, or suitable devices, as will now be shown and described.

On the drawing, Figure 1 is a ground plan. Fig. 2 is a central longitudinal section over the line A B, taken on Fig. 1; and Fig. 3 is an enlarged cross-section over the line C D, also taken on Fig. 1.

Similar letters refer to similar parts wherever they occur on the drawing.

*a* is a standard, secured firmly to the operating-board *b*. Around the standard *a* the cutting-machine is made to swing in a complete circle, more or less, as may be desired. The upper end of the standard *a* is made as a circular hub, *c*, through which the shaft *d* projects and in which it has its bearing and revolves. To the lower end of the shaft *d* is attached a bevel-gear, *e*, that gears into another bevel-gear, *f*, attached to the horizontal shaft *g*, as shown. The shaft *g* runs in a bearing in the side of the standard *a*, and is provided on its outer end with a pulley, *h*, to which the motive power can be applied in the ordinary way. An arm, *i*, is made to swing in a suitable manner around the standard *a*, for which purpose a hub, *k*, is slipped over the circular hub *c*, as shown. The outer end of the arm *i* is jointed to another arm, *l*, by means of the hinge-pin *m* that projects through suitable ears made on the arms *i* and *l*. The extreme outer end of the arm *l* terminates as a sleeve, *n*, in which the vertical shaft *o* revolves and has its bearing. The motion from the shaft *o* is communicated to the cutter-shaft *p* by means of a bevel-gear, *q*, attached to the shaft *o*, and another bevel-gear, *r*, attached to the cutter-shaft *p*. The cutter-shaft *p* is supported and made to revolve in a bored-out sleeve, *s*, provided with a hub, *t*, that fits over the lower end of the sleeve *n*, around which it may swing in a complete circle, as indicated by dotted lines on Fig. 1. A small set-screw, *u*, is screwed through the hub *t*, and projects in a circular groove made on the sleeve *n*, by which arrangement the hub *t* is connected to the sleeve *n* at the same time as it is allowed to swing around it. The cutter is movable to follow the line marked on the fabric by means of a handle situated near it. The operator can easily guide the cutter. The sleeve *s* may be made of any desired length, according to the shape or material we desire to cut. To the extreme end of the cutter-shaft *p* is secured the revolving cutter *w*, made as a circular disk, sharpened on its outside periphery, and when used is kept revolving.

The motive power from the shaft *d* to the shaft *o* may be conducted in the following or a similar manner: On the upper end of the shaft *d* is secured a belt or cord pulley, *x*, as shown, from which an endless belt or cord, 1, is carried over the pulley *y* that is made to run loose on the upper end of the hinge-pin *m*. On the top of the pulley *y* is a similar one, *z*, made in one piece with the pulley *y*, over which an endless belt or cord, 2, is carried to the pulley 3 keyed on the upper end of the shaft *o*, as shown. But we do not confine ourselves to this exact arrangement of the driving mechanism shown in our drawing, the vital part of our invention being the employment of a rotary cutter, with its foot-plate arranged so as to be swung or moved around a stationary standard attached to the operating-board. To the extreme outer end of the sleeve *s* is held an adjustable foot-piece or throat-plate, 4, provided with a foot, 5, by which arrangement the rotary cutter *w* is prevented from cutting the table *b* during the operation of the machine. The foot-piece 4 has a slot-hole, 6, in its upper end, through which the set-screw 7 is screwed into the sleeve *s*, as shown in Fig. 3, whereby the plate 5 may be raised and adjusted as the rotary cutter *w* wears off by continued sharpening. A small incision, whether partial or wholly through, is made in the foot 5 to serve as a guide for the cutting-wheel *w*.

During the operation of our machine the cloth to be cut passes between the foot 5 and the under side of the rotating disk *w*. In this manner the cloth or other material, whether single or of many thicknesses, is cut very evenly to any desired shape or pattern.

To operate our machine we set the rotary cutter in motion by means of the driving mechanism, as shown, or its equivalent. The cloth is laid on the table after first being marked to the desired pattern that is to be cut, and inserted between the foot 5 and the lower edge of the circular disk *w*, when the rotating cutter *w* can be guided over the cloth by means of the handle *v* in any desired direction.

By this, our rotating cutting-wheel, we are able to cut as many as twenty thicknesses, or more, of the same material, as formerly an operator could only cut four or six thicknesses with a pair of ordinary shears, thus saving a great deal of time and labor in the manufacture of ready-made clothing or similar articles.

Having thus fully described the nature, construction, and operation of our invention, we wish to secure by Letters Patent, and claim—

1. A rotary cutting-disk, *w*, arranged and operated upon the end of one or a series of swinging arms movable around a standard, *a*, in any direction, for the purpose herein set forth and described.

2. The combination of a rotary cutting-disk and the foot or throat plate, as and for the purpose herein shown and described.

3. The sleeve *s*, made to swing around the sleeve *n*, and the jointed arms *l i*, one or more, or their equivalents, for the purpose herein shown and described.

4. The driving mechanism herein described, consisting of the bevel-gears *e f*, or their equivalents, shaft *d*, with its pulley *x* attached, loose pulleys *y z*, belts 1 2, the pulley 3 attached to the shaft *o*, bevel-gears *q r*, or their equivalents, and the cutting-shaft *p*, for the purpose described.

5. In combination, the rotary cutting-disk *w*, the throat or foot plate 4 5, one or more movable arms *i l*, or their equivalents, and the stationary standard *a*, for the purpose herein fully set forth and described.

ISAAC FENNO.
PATRICK HOWE.

Witnesses:
ALBAN ANDRÉN,
GEORGE B. PHELPS.